US007982337B2

(12) United States Patent
Tsukamoto

(10) Patent No.: US 7,982,337 B2
(45) Date of Patent: Jul. 19, 2011

(54) DC-DC CONVERTER CONTROL CIRCUIT

(75) Inventor: Hiroshi Tsukamoto, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 184 days.

(21) Appl. No.: 12/379,831

(22) Filed: Mar. 3, 2009

(65) Prior Publication Data

US 2009/0224602 A1   Sep. 10, 2009

(30) Foreign Application Priority Data

Mar. 4, 2008 (JP) ................................ 2008-052790

(51) Int. Cl.
*H02J 3/14* (2006.01)
(52) U.S. Cl. .......................................................... 307/31
(58) Field of Classification Search ................... 307/31; 327/175, 114; 323/234, 237
See application file for complete search history.

(56) References Cited

U.S. PATENT DOCUMENTS

| 6,194,936 B1 * | 2/2001 | Yama .............................. 327/175 |
| 6,798,262 B2 * | 9/2004 | Zhang ............................. 327/175 |
| 6,963,323 B2 * | 11/2005 | Sakurai et al. .................. 345/89 |
| 7,049,784 B2 | 5/2006 | Suzuki |
| 7,268,448 B2 * | 9/2007 | Hasegawa ........................ 307/31 |
| 7,777,474 B2 * | 8/2010 | Maekawa et al. ............. 323/288 |

FOREIGN PATENT DOCUMENTS

| JP | 2004-248377 A | 9/2004 |
| JP | 02004320826 A | * 11/2004 |

* cited by examiner

*Primary Examiner* — Albert W Paladini
(74) *Attorney, Agent, or Firm* — Foley & Lardner LLP

(57) ABSTRACT

There is provided a DC-DC converter control circuit, wherein a reference feedback signal related to a supply voltage to a load is compared to a reference oscillation signal to generate a result of comparison. The result of comparison is used as a switching control signal to control the supply voltage to the load. The result of comparison is frequency divided to generate a frequency divided signal; and the switching control signal is generated in response to the frequency divided signal.

9 Claims, 5 Drawing Sheets

DC-DC CONVERTER CONTROL CIRCUIT

REFERENCE TO RELATED APPLICATION

This application is based upon and claims the benefit of the priority of Japanese patent application No. 2008-052790 filed on Mar. 4, 2008, the disclosure of which is incorporated herein in its entirety by reference thereto.

FIELD OF THE INVENTION

This invention relates a control circuit used for a DC-DC converter as a switching regulator. More particularly, it relates to a DC-DC converter control circuit that uses a pulse-width modulation (PWM) system.

BACKGROUND

A DC-DC converter is used extensively for a variety of equipments and apparatuses. However, in a given equipment or apparatus, there are a plurality of loads to which power from a power supply or power supplies is to be delivered. Moreover, load current value needed differs from one load to another.

For example, in a portable equipment, such as a digital still camera or camcorder, a load or loads in need of a heavier load current, such as an electric motor, and a load or loads in need of a lighter load current, such as a CCD (charge coupled device) or an LCD (liquid crystal device), exist together. For a heavier load, the frequency of a switching signal needs to be higher in order to get a load current that is needed. However, driving the light load with such high switching signal in turn increases switching loss. So, for a light load, it is beneficial to suppress the frequency of the switching signal to decrease the switching loss to improve the power supply efficiency.

Thus, a driving voltage outputting device, shown for example in Patent Document 1, includes a reference oscillator for each of multiple loads which is designed to generate a switching signal having a frequency appropriate for a load of interest. In this Patent Document 1, the reference oscillator is a triangular wave generator.

[Patent Document 1] JP Patent Kokai Publication No. JP-P2004-248377A

SUMMARY

The entire disclosure of Patent Document 1 is incorporated herein by reference thereto. The following analyses are given by the present invention.

However, if switching signals having respective different frequencies are out of synchronization with one another, switching noise is produced. This switching noise tends to act as a noise for the LCD or CCD thus affecting the quality of pictures displayed.

Such noise may be suppressed by synchronizing the reference oscillators. However, a large size trimming circuit is needed especially in the case of a triangular wave generator. If the reference oscillators with such trimming circuit be arranged as a semiconductor integrated circuit, its chip size would be increased. After all, providing a plurality of reference oscillators leads to an increased chip area and increased power consumption. Thus there is much to be desired in the art.

According to an aspect of the present invention, there is provided a DC-DC converter control circuit in which a feedback signal varied in response to a supply voltage to a load is compared to a reference oscillation signal to generate a result of comparison. The result of comparison is used as a switching control signal to control the supply voltage to the load. The result of comparison is frequency divided to generate a frequency divided signal, and the switching control signal is generated in response to the so generated frequency divided signal.

According to another aspect, there is provided a DC-DC converter control circuit comprising: a first control block and a second control block. In the first control block, a first feedback signal, related to a supply voltage to a first load, is compared to a reference oscillation signal, to generate a first result of comparison; the first control block generating, from the first result of comparison, a first switching control signal that controls the supply voltage to the first load. In the second control block, a second feedback signal, related to a supply voltage to a second load, is compared to the reference oscillation signal, to generate a second result of comparison. The second control block frequency divides the second result of comparison to generate a frequency divided signal. The second control block generates a second switching control signal from the frequency divided signal to control the supply voltage to the second load.

The meritorious effects of the present invention are summarized as follows.

Thus, according to the present invention, the desired frequency, which is in meeting with the load for the switching signal, is obtained not from an oscillation signal, as a reference signal, but on frequency dividing the result of comparison between the oscillation signal and a feedback signal. Hence, the frequency of the switching signal is substantially matched to a frequency inherent to the oscillation signal.

Thus, two switching signals, substantially synchronized with each other and having respective different frequencies, may be produced with the use of a common reference oscillator, even in case the oscillator is a triangular wave generator.

Figure 1:
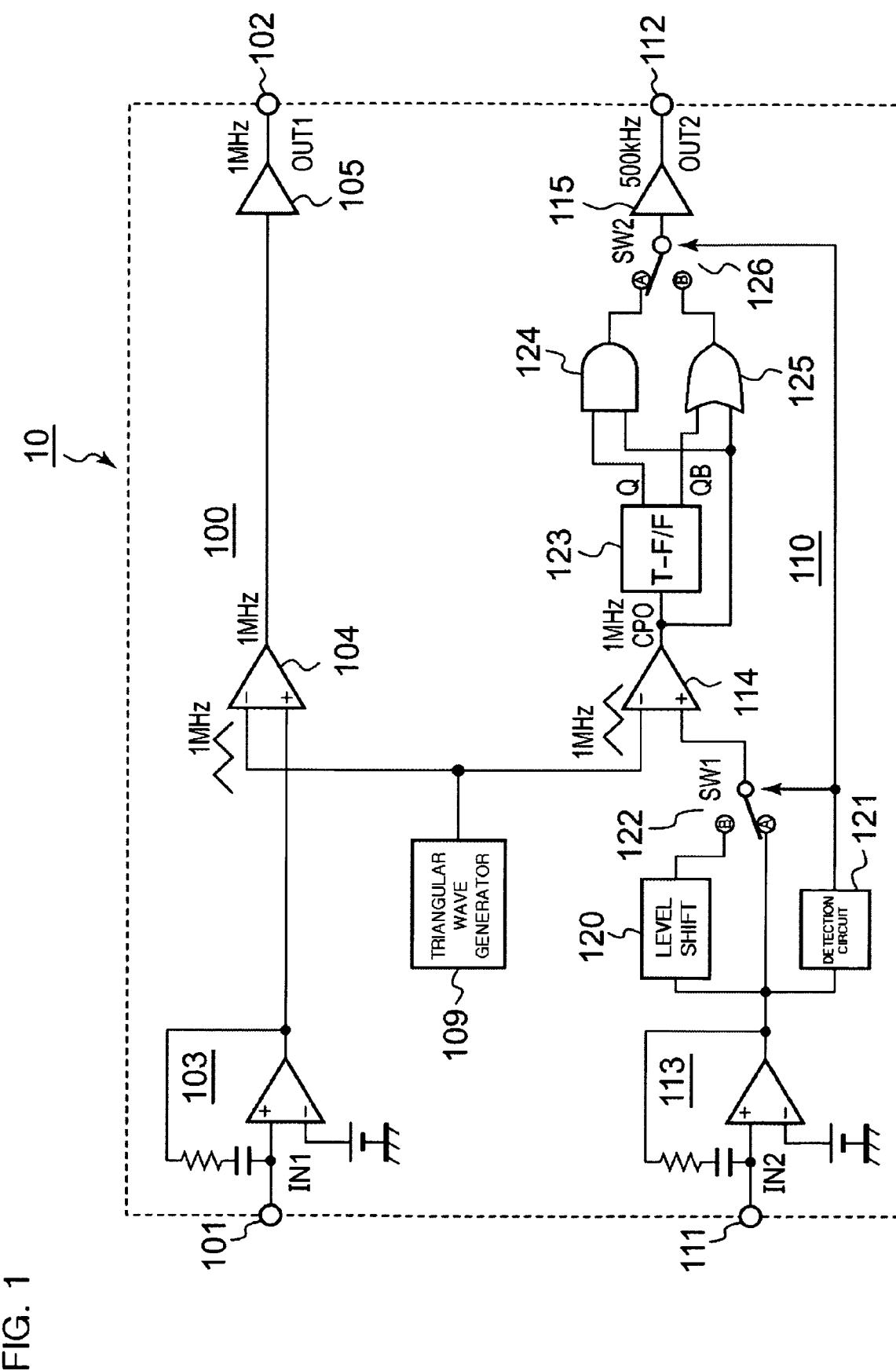
FIG. 1 is a block diagram showing a DC-DC converter control circuit according to a first exemplary embodiment of the present invention.

Note that the drawings are shown by way of examples for convenience of illustration and explanation, and the illustrated drawings should never interpreted as limitative.

PREFERRED MODES

According to a first mode, there is provided a DC-DC converter control circuit comprising: a comparing unit that compares a reference feedback signal related to a supply voltage to a load to a reference oscillation signal to generate a result of comparison, the result of comparison being used as a switching control signal to control the supply voltage to the load; a frequency dividing unit for frequency dividing the result of comparison to generate a frequency divided signal;

and a switching control signal generating unit for generating the switching control signal in response to the frequency divided signal.

In the second mode, the following is preferred.

When the feedback signal reaches a preset level, a signal obtained on level-shifting the feedback signal is compared to the reference oscillation signal to provide a result as the result of comparison.

In the third mode, the following is preferred.

The switching control signal is generated in response to the result of comparison and the frequency divided signal until the feedback signal reaches the preset level, and wherein, when the feedback signal reaches the preset level, the switching control signal is generated in response to the result of comparison and to an inversion signal of the frequency divided signal.

In a fourth mode, the DC-DC converter control circuit may be as follows.

There are a first control block and a second control block. The first control block comprises a first comparing unit that compares a first feedback signal, related to a supply voltage to a first load, to a reference oscillation signal, to generate a first result of comparison so as to generate, from the first result of comparison, a first switching control signal that controls the supply voltage to the first load. The second control block comprises a second comparing unit that compares a second feedback signal, related to a supply voltage to a second load, to the reference oscillation signal, to generate a second result of comparison. The second control block frequency divides the second result of comparison to generate a frequency divided signal to generate a second switching control signal from the frequency divided signal to control the supply voltage to the second load.

In a fifth mode, the following is preferred.

When the second feedback signal reaches a preset level, the second control block compares a signal obtained on level-shifting the second feedback signal to the reference oscillation signal to provide a result thereof as the second result of comparison.

In a sixth mode, the following is preferred.

The second control block generates the second switching control signal in response to the second result of comparison and to the frequency divided signal until the second feedback signal reaches a preset level, and when the second feedback signal reaches the preset level, the second control block generates the second switching control signal in response to the second result of comparison and to an inversion signal of the frequency divided signal.

Referring to the drawings, certain preferred exemplary embodiments will be described in detail.

FIG. 1 depicts a block diagram showing a DC-DC converter control circuit 10 according to a first exemplary embodiment. The present control circuit 10 is formed as a semiconductor integrated circuit device (LSI), and includes two DC-DC converter control blocks 100, 110 of the PWM system and a triangular wave generator 109 as a reference oscillator shared by the two blocks. Three or more DC-DC converter control blocks may also be used, in which case a third and a following control block or blocks may share the triangular wave generator 109, too, or may receive a signal from another triangular wave generator.

In the present exemplary embodiment, the triangular wave generator 109 generates a triangular wave with a frequency of 1 MHz, by way of an example as a high frequency.

The DC-DC converter control block 100 is provided for a heavier load. Hence, an output of a PWM comparator 104, receiving a triangular wave oscillation signal at its inverting input terminal (−), is delivered via a driver buffer 105 to an output terminal 102 as a switching control signal, thus, resulting in a frequency of the switching control signal at 1 MHz.

An output of a buffer amplifier 103, made up of a resistor, a capacitor, a reference voltage source and an operation amplifier (OP-Amp), is delivered to a non-inverting input terminal (+) of the PWM comparator 104. A feedback signal, related to a supply voltage to the load (not shown), controlled by the present control block 100, is delivered via an input terminal 101 to the buffer amplifier 103. Namely, the output of the buffer amplifier 103 is fed back via the resistor and capacitor connected in series to the non-inverting terminal 101 is connected.

On the other hand, the DC-DC converter control block 110 is provided for a lighter load. Hence, an output of a PWM comparator 114, receiving the triangular wave from the triangular wave generator 109 at its inverting terminal (−), is delivered to a T-flipflop (T-F/F) 123 so as to be halved in frequency. A Q-output of the T-flipflop, that is, a ½ frequency divided signal, is delivered to an input node of an AND gate 124 along with an output of the comparator 114 delivered to the other input thereof. A QB-output, an inversion of the Q-output, is supplied, along with the output of the comparator 114, to an OR gate 125. Output signals of the gates 124, 125 are delivered to input terminals A, B of a switching circuit 126, which switching circuit (SW2) 126 selects one of the input signals responsive to the logical level of a control signal output from a detection circuit 121. The so selected signal is delivered as a switching control signal via a buffer driver 115 to an output terminal 112, thus resulting in a frequency of the switching control signal at 500 kHz.

A feedback signal, related to the supply voltage to the load (now shown), and which is controlled by the DC-DC converter control block 110, is delivered via an input terminal 111 to a buffer amplifier 113 made up of a resistor, a capacitor, a reference voltage source and an OP Amp. The buffer amplifier 113 is formulated like the buffer amplifier 103. An output of the buffer amplifier 113 is delivered to an input terminal A of a switching circuit (SW1) 122, to the other input terminal B of which is delivered an output of a level shift circuit 120 that shifts the level of the buffer amplifier 113 towards the ground potential side. This level shift circuit may be made up of a well-known source or emitter follower circuit.

The output of the buffer amplifier 113 is also supplied to the detection circuit 121. This detection circuit 121 includes a reference voltage source, not shown, and a comparator, also not shown, and compares an output level of the buffer amplifier 113 to a reference voltage. The detection circuit 121 outputs, e.g., a high-level signal, as one of the logical levels, in case the output level of the amplifier 113 is not less than the reference voltage, while outputting a low-level signal, as the other logical level, in case the output level of the amplifier 113 is less than the reference voltage.

In case the output of the detection circuit 121 is at a low level, the switching circuits 122, 126 select the input terminals on the sides A, as shown in the figure. In case the output of the detection circuit 121 is at a high level, both the switching circuits SW1, SW2 select the opposite side, that is, the sides B.

Figure 2:
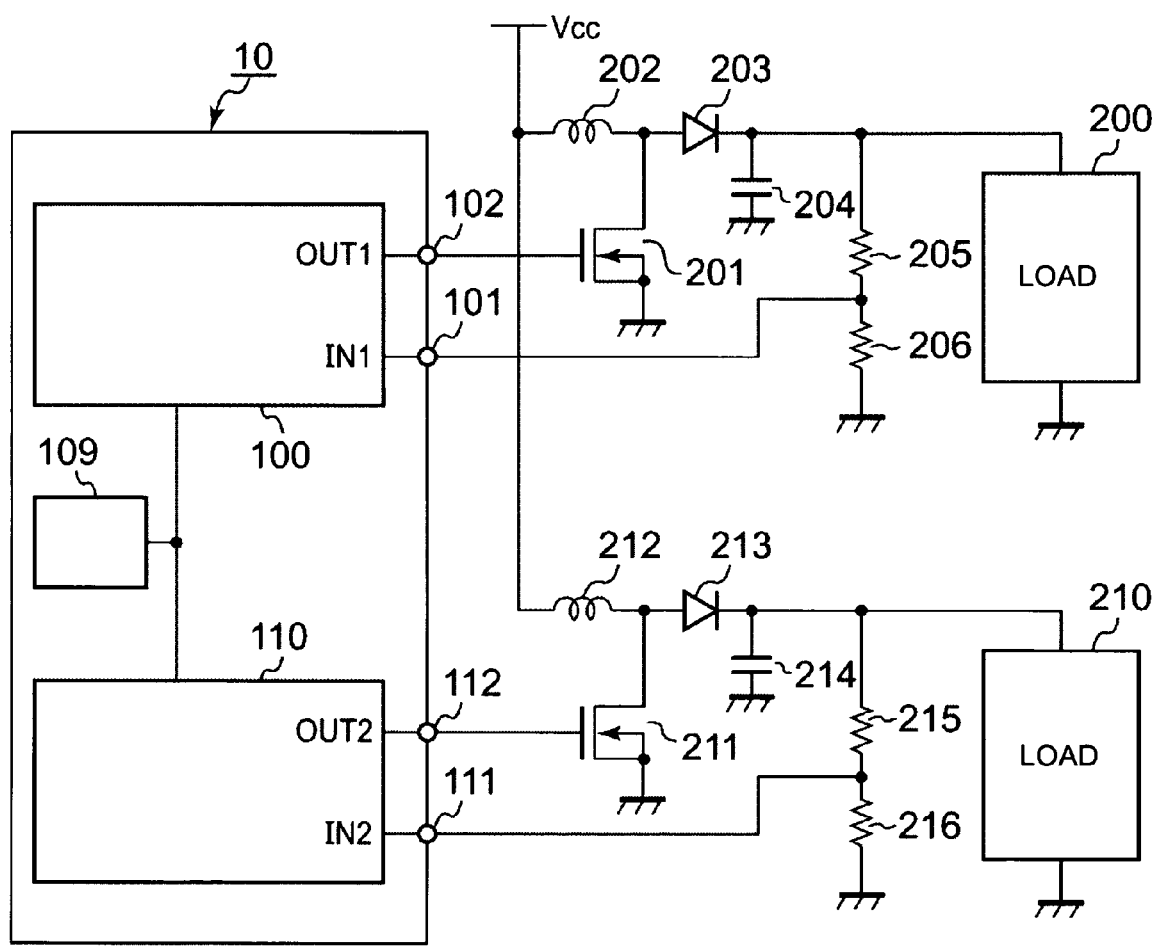
FIG. 2 is a block diagram showing a switching regulator employing the DC-DC converter control circuit of FIG. 1.

FIG. 2 shows a DC-DC converter that uses the present control circuit 10. The control circuit 10 is constructed as a switching regulator, such that a switching control signal OUT1, delivered via the output terminal 102 from the control block 100, controls the switching operation of an N-channel MOS transistor 201. The DC-DC converter cooperates with a coil (inductor) 202, a diode 203 and a capacitor 204 to generate a power supply voltage needed by a load 200 which is in need of a higher load current. This power supply voltage is divided by resistors 205, 206, and the resulting divided voltage is delivered as a feedback voltage to the input terminal (IN1) 101 of the control circuit 10.

On the other hand, a switching control signal OUT2 via the output terminal 112 of the control block 110 controls the switching operation of an N-channel MOS transistor 211. The control block 110 cooperates with a coil 212, a diode 213 and with a capacitor 214 to generate a power supply voltage, needed by a load 210, which in turn is in need of a lower load current. This power supply voltage is divided by resistors 215, 216, and the so divided voltage is delivered to the input terminal (IN2) 111 of the control circuit 10 as a feedback voltage.

In the above arrangement, the operation of controlling the supply voltage to the load 200 by the control block 100 and its peripheral circuit (i.e., the peripheral circuit made up of the transistor 201, resistors 205, 206, coil 202, diode 203 and the capacitor 204) is well-known. Hence, dialed explanation of the operation is dispensed with, and only the operation of the control block 110 is described.

Since the control block 110 controls the supply voltage to the load 210 that is in need of a lower load current, the switching loss is increased in case the frequency of the switching control signal is equal to that of the triangular wave generator. Hence, the output of the PWM comparator 114, frequency-divided by the T-F/F 123, is used as a switching control signal to reduce the switching loss as well as to synchronize the PWM comparator 104 output with the switching control signal OUT1 from the control block 100.

In the present exemplary embodiment, the PWM comparator 114 handles a signal of 1 MHz, whereas the switching control signal OUT2 for the transistor 211 (FIG. 2) is a signal of a half frequency thereof, that is, 500 kHz. Thus, if the output signal of the buffer amplifier 113 by itself is compared to the triangular wave signal, only approximately, 0 to 50% of the duty ratio of the switching control signal OUT2 may be covered. Hence, there are provided the level shift circuit 120, the detection circuit 121 and the switch (SW1) 122 in order to give sufficient coverage.

Figure 3:
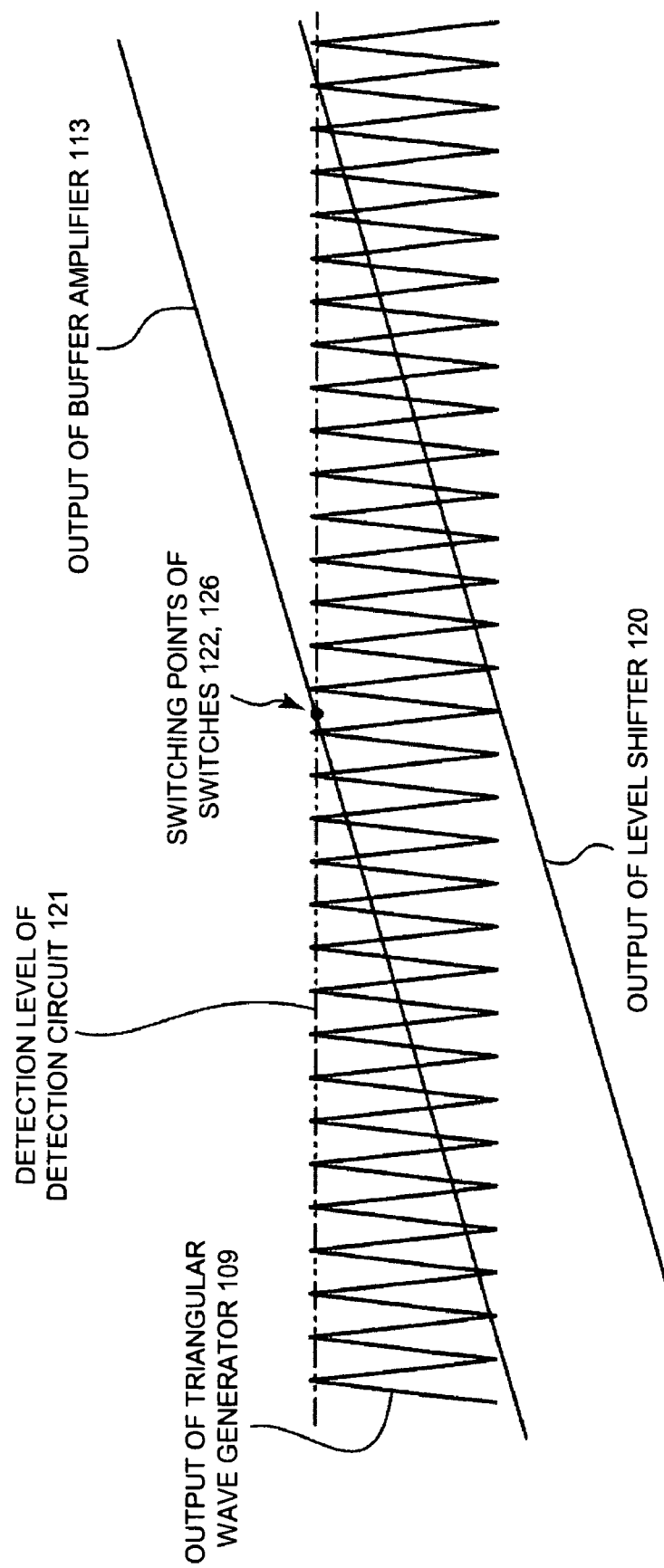
FIG. 3 is a signal waveform diagram showing outputs from certain component parts of the circuit of FIG. 1.

That is, referring to FIG. 3, an approximate peak level of the triangular wave signal from the triangular wave generator 109 is used as a level of a reference voltage source (not shown), provided in the detection circuit 121. At a time point when the output of the buffer amplifier 113 has reached the reference voltage level, the output logic level of the detection circuit 121 is switched to deliver the output of the level shift circuit 120 via the switch 122 to the PWM comparator 114. The level shift circuit 120 is thus designed and constructed so that, at a time point of switching of the switch 122, the output level of the buffer amplifier 113 is shifted to a level that is substantially the bottom level of the output signal of the triangular wave generator 109.

Figure 4:
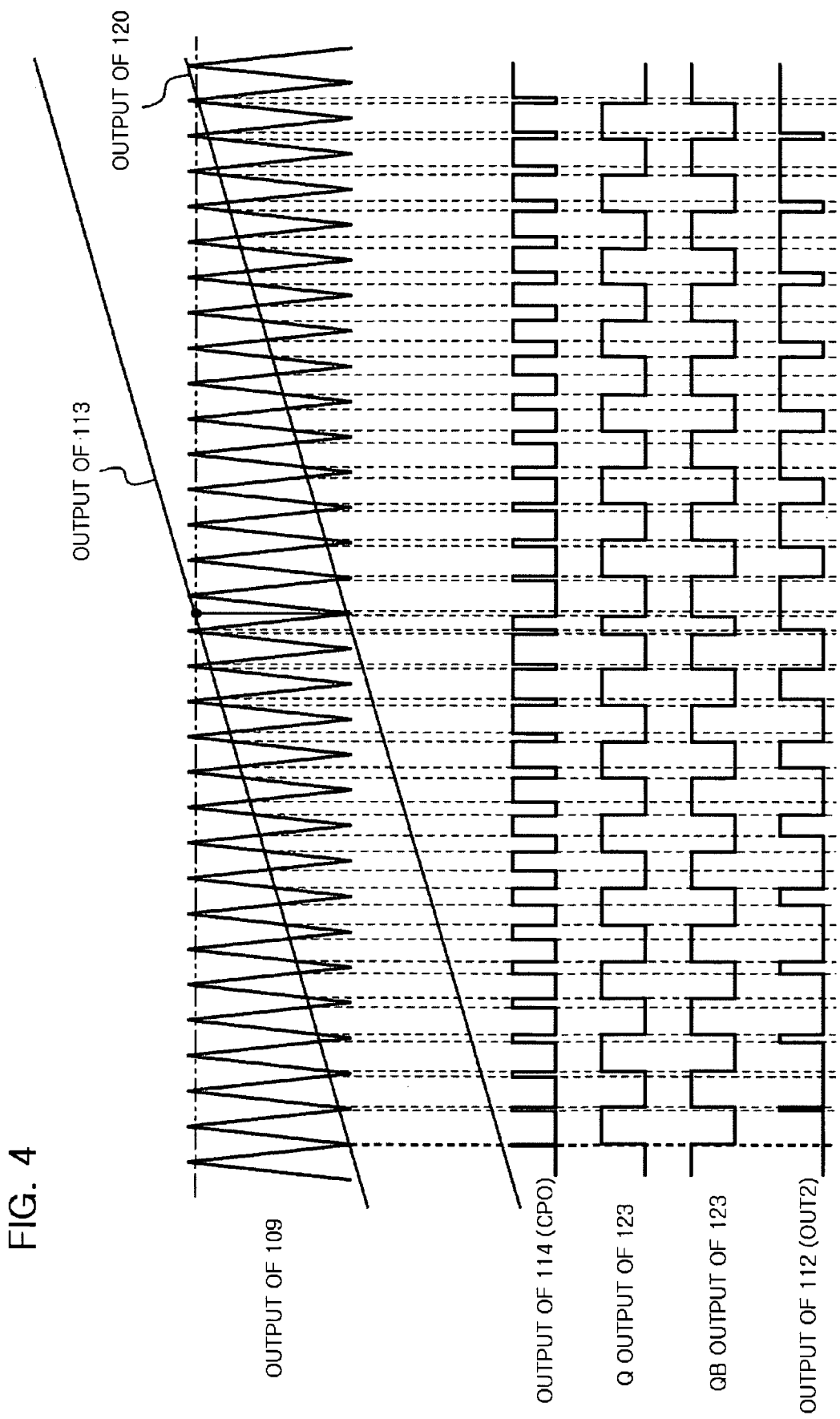
FIG. 4 is a signal waveform diagram showing the signal waveforms of FIG. 1 and outputs from other component parts of the circuit of FIG. 1.

Thus, referring to FIG. 4, showing the signal waveform downstream of the PWM comparator 114, as well as the signal waveform of FIG. 3, in case the switch 122 is shifted to its A-side input, that is, to the side of (the output of) the buffer amplifier 113, the switch 126 is also shifted to its A-side input, that is, towards the side of the gate circuit 124. Hence, the PWM switching control signal OUT2 that covers approximately 50% of the duty ratio is produced.

If conversely the output of the buffer amplifier 113 has reached the detection level of the detection circuit 121, the switch 122 is shifted to the side of the level shift circuit 120, while the switch 126 is shifted to the side of the (inverting AND) gate circuit 125. Hence, the PWM switching control signal OUT2 that covers 50% or higher of the duty ratio is produced, i.e., covering 50 to 100%. In other words, by comparing the operation of the control block 100 and the control block 110, a full range of the duty ratio (0 to 100%) can be covered.

Since there would be occurrence of a low level interval of a duty ratio ½ if the output signal of the buffer amplifier 113 is only compared with the triangular wave signal of 1 MHz and frequency divided to ½, the switching control signal OUT2 can only cover the duty ratio range of 0 to 50%. In contrast, the DC-DC convertor control circuit 10 of FIG. 1 covers the duty ratio range of 0 to 50% by taking a logical product of a comparison result (signal CPO of FIG. 1) and the Q-output signal obtained by frequency dividing the comparison result to ½, in which the comparison is made between the output signal (signal at input terminal A) of the buffer amplifier 113 and the triangular wave signal. The switching control signal OUT2 also covers the duty ratio range of 50 to 100% by taking a logical sum between the comparison result (signal CPO) and the QB-output signal obtained by frequency dividing the comparison result to ½ followed by inverting, in which the comparison is made between the signal (signal at input terminal B) obtained by level-shifting the output signal of the buffer amplifier 113 to the ground potential side and the triangular wave signal, to provide the comparison result signal CPO.

Thus, the switching signals OUT1, OUT2 are substantially synchronized with respect to the signal from the triangular wave generator 109 shared by the two switching signals. The result is that not only the switching noise may be reduced, but also the number of component parts may be decreased. That is, when the DC-DC converters are arranged in unison as a semiconductor integrated circuit, the chip may be reduced in size.

Figure 5:
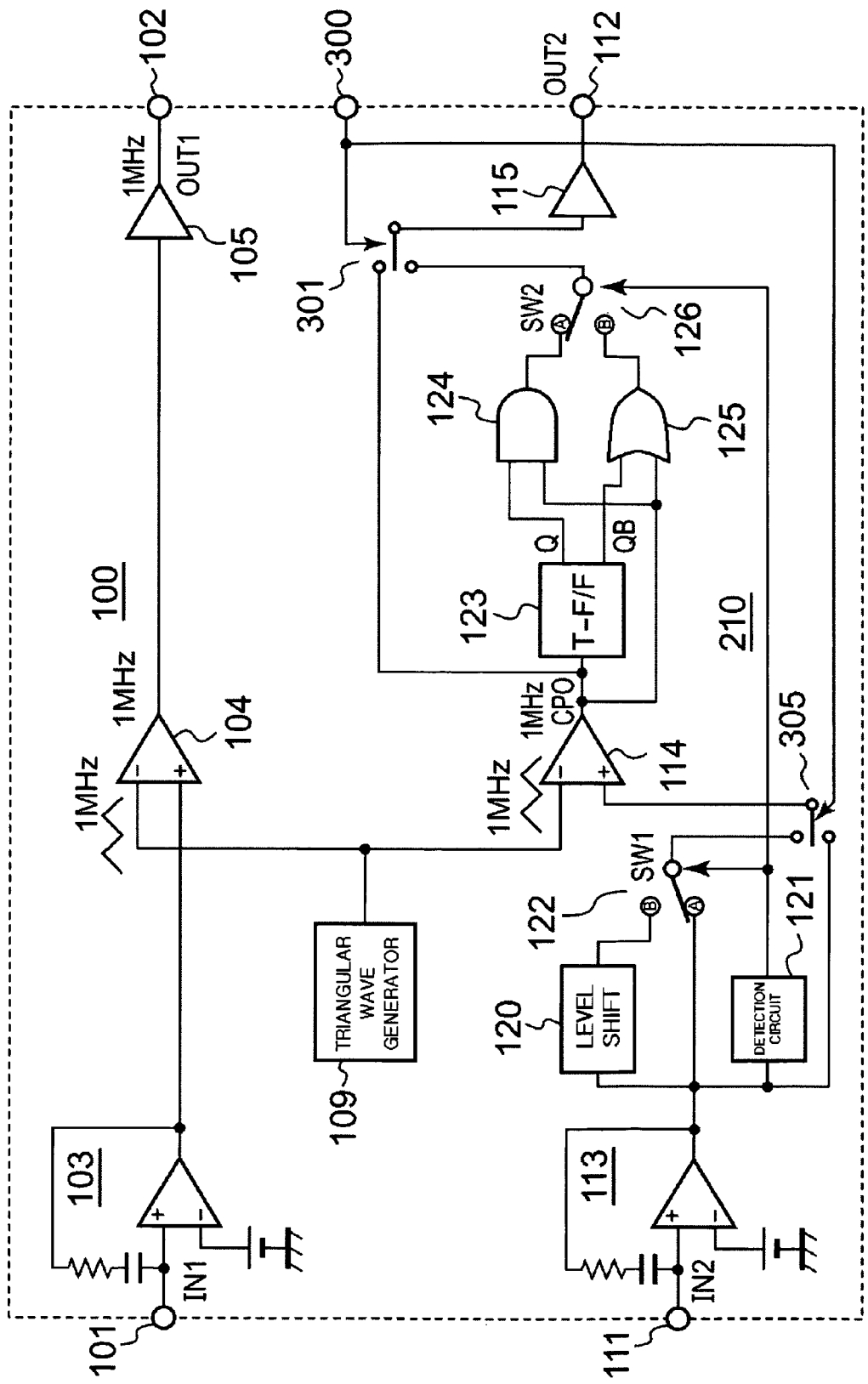
FIG. 5 is a block diagram showing a DC-DC converter control circuit according to a second exemplary embodiment of the present invention.

FIG. 5 depicts a block diagram showing a DC-DC converter control circuit 20 according to a second exemplary embodiment of the present invention. The components which are the same as those shown in FIG. 1 are indicated by the same reference numerals or symbols and description thereof is dispensed with.

In the present exemplary embodiment, there are additionally provided switching circuits 301, 305. One of inputs of the switch 301 is supplied with an output of the PWM comparator 114, while its other input is supplied with an output of the switch (SW2) 126. An output of the switch 301 is delivered to the buffer driver 115 under control by a switch control terminal 300. One of inputs of the switch 305 is supplied with an output of the buffer amplifier 113, while its other input is supplied with an output of the switch (SW1) 122. The switch 305 has its output connected to a non-inverting terminal (+) of the PWM comparator 114, and has its switching operation controlled by a signal from the switch control terminal 300. Namely, both the additional switches 301 and 305 are controlled in synchro with each other.

If, in the above arrangement, the load controlled by the control block 210 is in need of a higher load current, one of the low level and the high level is supplied to the terminal 300 to set the switch 301 towards the side (upper note) of the PWM comparator 114 and to set the switch 305 towards the side (lower note) of the buffer amplifier 113. By so doing, the operation of the control block 210 now proceeds identically with that of the control block 111. If the signal level of the terminal 300 is set to the other of the low level and the high level, the switches 122, 126 are activated turned to a connection state, which permits switching power supply control for a load that is in need of a lighter load.

Thus, it becomes possible to control both a heavy load and a light load, or two heavy loads, using the common triangular wave generator 109, thus implementing an arrangement optimum for the needed load current.

According to the present invention, the output of the PWM comparator is frequency-divided and a switching control signal is obtained on the basis of the frequency divided signal, as described above. It is thus possible to exercise control, from the common reference oscillation signal, in meeting with the load being controlled. Hence, the control block 100, shown in FIG. 5, may be dispensed with. Alternatively, it is possible to use other frequency division ratio of, for example, ⅓ for the PWM comparator output. The gates 123 to 125 may be replaced by other operationally equivalent logic circuits.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A DC-DC converter control circuit, wherein a reference feedback signal related to a supply voltage to an operatively coupled load is compared to a reference oscillation signal by a comparing unit to generate a result of comparison, said result of comparison being used as a switching control signal to control the supply voltage to said load,
said result of comparison being frequency divided by a frequency dividing unit to generate a frequency divided signal; and
said switching control signal being generated by a switching control signal generating unit in response to said frequency divided signal.

2. The DC-DC converter control circuit according to claim 1, wherein, when said feedback signal reaches a preset level, the comparing unit compares a signal obtained on level-shifting said feedback signal to said reference oscillation signal to provide a result as said result of comparison.

3. The DC-DC converter control circuit according to claim 2, wherein said switching control signal generating unit generates said switching control signal in response to said result of comparison and said frequency divided signal until said feedback signal reaches said preset level, and wherein, when said feedback signal reaches said preset level, said switching control signal is generated in response to said result of comparison and to an inversion signal of said frequency divided signal.

4. A DC-DC converter control circuit comprising:
a first control block and a second control block,
wherein in said first control block, a first comparing unit is configured to compare a first feedback signal, related to a supply voltage to a first load operatively connected to the first control block, to a reference oscillation signal, to generate a first result of comparison; said first control block configured to generate, from said first result of comparison, a first switching control signal that controls said supply voltage to said first load; and
wherein in said second control block, a second comparing unit is configured to compare a second feedback signal, related to a supply voltage to a second load operatively connected to the second control block, to said reference oscillation signal, to generate a second result of comparison; said second control block configured to frequency divide said second result of comparison to generate a frequency divided signal; said second control block configured to generate a second switching control signal from said frequency divided signal to control said supply voltage to said second load.

5. The DC-DC converter control circuit according to claim 4, wherein, when said second feedback signal reaches a preset level, said second comparing unit compares a signal obtained on level-shifting said second feedback signal to said reference oscillation signal to provide a result thereof as said second result of comparison.

6. The DC-DC converter control circuit according to claim 5 wherein said second control block is configured to generate said second switching control signal in response to said another result of comparison and to said frequency divided signal until said second feedback signal reaches a preset level, and wherein, when said second feedback signal reaches said preset level, said second control block generates said second switching control signal in response to said another result of comparison and to an inversion signal of said frequency divided signal.

7. A DC-DC converter control circuit comprising:
a plurality of comparing units, wherein each unit compares a reference feedback signal related to a supply voltage to a respective load to a reference oscillation signal to generate a result of comparison for each respective load, said result of comparison being used as a switching control signal to control the supply voltage to said respective load;
a plurality of frequency dividing units for frequency dividing said result of comparison to generate a frequency divided signal for each respective load; and
a plurality of switching control signal generating units for generating said switching control signal for each respective load in response to said frequency divided signal.

8. The DC-DC converter control circuit according to claim 7, wherein, when said feedback signal related to a respective load reaches a preset level, a signal obtained on level-shifting said feedback signal is compared to said reference oscillation signal to provide a result as said result of comparison for said respective load.

9. The DC-DC converter control circuit according to claim 8, wherein said switching control signal for a respective load is generated in response to said result of comparison for the respective load and said frequency divided signal until said feedback signal for said load reaches said preset level, and wherein, when said feedback signal reaches said preset level, said switching control signal is generated in response to said result of comparison and to an inversion signal of said frequency divided signal.

* * * * *